(12) United States Patent
Trushin

(10) Patent No.: US 11,352,222 B2
(45) Date of Patent: Jun. 7, 2022

(54) SECTION CONTROL SYSTEM

(71) Applicant: Ausplow Pty. Ltd., Cockburn Central (AU)

(72) Inventor: Alexander Trushin, Cockburn Central (AU)

(73) Assignee: Ausplow Pty Ltd, Cockburn Central (AU)

( * ) Notice: Subject to any disclaimer, the term of this patent is extended or adjusted under 35 U.S.C. 154(b) by 0 days.

(21) Appl. No.: 17/003,723

(22) Filed: Aug. 26, 2020

(65) Prior Publication Data

US 2021/0053774 A1 Feb. 25, 2021

(30) Foreign Application Priority Data

Aug. 22, 2019 (AU) .............................. 2019903067

(51) Int. Cl.
| *B65G 53/52* | (2006.01) |
| *B65G 53/04* | (2006.01) |
| *B65G 53/66* | (2006.01) |
| *B65G 53/60* | (2006.01) |
| *A01C 7/04* | (2006.01) |

(52) U.S. Cl.
CPC .............. *B65G 53/04* (2013.01); *A01C 7/042* (2013.01); *B65G 53/60* (2013.01); *B65G 53/66* (2013.01)

(58) Field of Classification Search
CPC ...... B65G 53/528; B65G 53/58; B65G 53/66; B65G 2205/00; B65G 2812/1625; A01C 7/042; A01C 7/084

USPC ............. 406/12, 84, 155, 181, 183; 111/175
See application file for complete search history.

(56) References Cited

U.S. PATENT DOCUMENTS

| 4,553,925 A | * | 11/1985 | Bricmont | ................ | F23C 7/008 |
| | | | | | 137/883 |
| 4,609,009 A | * | 9/1986 | Tisone | ............... | B01D 46/0043 |
| | | | | | 137/561 A |
| 5,551,469 A | * | 9/1996 | Woerheide | ............ | F22B 37/227 |
| | | | | | 137/561 A |
| 5,967,167 A | * | 10/1999 | Johnson | ................. | A01K 39/02 |
| | | | | | 137/14 |
| 6,032,690 A | * | 3/2000 | Weissfloch | .............. | F16K 7/126 |
| | | | | | 137/599.08 |
| 6,036,107 A | * | 3/2000 | Aspen | ................. | A01M 7/0089 |
| | | | | | 137/883 |
| 6,675,728 B2 | * | 1/2004 | Lee | ........................ | A01C 7/081 |
| | | | | | 111/175 |

(Continued)

*Primary Examiner* — Joseph A Dillon, Jr.
(74) *Attorney, Agent, or Firm* — Fitch, Even, Tabin & Flannery, LLP

(57) ABSTRACT

An assembly to distribute flowable particulate material, the assembly including: a conduit to which the material is delivered and to which an airstream is supplied to move the material along the conduit to a delivery downstream destination; material delivery means connected to the conduit for delivery of material to the downstream destination; control means operatively associated with the material delivery means to selectively deliver a pre-determined rate of the material to a separator to engage the airstream to concentrate the material in a portion of the airstream, the separator being positioned within the conduit upstream of the material delivery means; air distribution means in constant fluid communication with the separator and the material delivery means to control airflow to the material delivery means.

16 Claims, 6 Drawing Sheets

(56) References Cited

U.S. PATENT DOCUMENTS

| | | | | |
|---|---|---|---|---|
| 7,555,990 | B2* | 7/2009 | Beaujot | A01C 7/088 |
| | | | | 111/123 |
| 7,690,440 | B2* | 4/2010 | Dean | A01C 7/088 |
| | | | | 172/179 |
| 10,149,427 | B2* | 12/2018 | Bourgault | A01C 7/206 |
| 10,178,822 | B2* | 1/2019 | Ryan | A01C 5/068 |
| 10,779,460 | B2* | 9/2020 | Pirkenseer | A01C 7/084 |
| 2007/0181048 | A1* | 8/2007 | Pleyer | A01C 7/082 |
| | | | | 111/175 |
| 2012/0111418 | A1* | 5/2012 | Hu | B65G 53/523 |
| | | | | 137/14 |
| 2012/0301231 | A1* | 11/2012 | Jagow | A01C 7/082 |
| | | | | 406/183 |
| 2013/0136546 | A1* | 5/2013 | Friedmann | B60L 13/04 |
| | | | | 406/181 |
| 2018/0077856 | A1* | 3/2018 | Rice | A01B 49/06 |
| 2018/0317379 | A1* | 11/2018 | Pirkenseer | A01C 7/084 |
| 2021/0202121 | A1* | 7/2021 | Bezlepkin | G21D 1/02 |

* cited by examiner

SECTION CONTROL SYSTEM

FIELD

The present invention relates to assemblies that use air to distribute granular material (particulate material), and more particular, but not exclusively, to air systems that deliver seed and/or fertiliser to plough assemblies of a plough.

BACKGROUND

Previously, seed and/or fertiliser is delivered to the plough assemblies of a plough by air systems. Existing plough assemblies are described in Australian Patents 528237, 541415, 640025, 675376 and 2007202357, as well as Australian Patent Applications 2011201476 and 2014218387.

More recently, further plough assemblies have been described in Australian Patent Application 2016265961 (U.S. Ser. No. 15/406,239—A Seeding Tool).

Seeding is typically done by at least two pieces of equipment, the air seeder or 'bin' and the seeder bar or 'bar'. The tillage bar has tool bars to which are affixed tines for subsoil cultivation and preparing a seed bed and placing the seed. The bin is either before or pulled after the bar and it has tanks which carry seed and fertiliser 'product'. The air seeder then paddles the product or meters a calibrated amount into one or more air streams where it firstly transported and then distributed to the outlets on the bar.

The seeder bars may be quite wide and in some cases, up to 24 metres. For large paddocks the seeder bars go up and back and but stop seeding before the end of the paddock so the rig may be turned around and go back the other way. This necessitates that the seeding be stopped before the end of the paddock so that there is space to turn the machine around. Once the up and back seeding is complete it is usual to do a few laps around the outer edge of the paddock filling in all the unseeded areas. Also, it may not be possible to seed properly where there are obstacles such as trees and rocky outcrops and the machine has to seed over what has already been seeded. It is preferable to seed rather than miss out a section due to firstly lost cropping area and that the crop controls the weeds by way of competition necessitating less chemical spraying.

Described in U.S. Pat. No. 7,690,440B2 are multiple metering wheels in the metering unit which are shut off to the product by use of a sliding door above the wheel. This then stops the wheel being able to meter the product into one of the smaller diameter lines that run to the bar before further division and arriving at the tine. However, one drawback with this is that often there is enough product especially canola to seed many hectares (at 1 kg/Ha) before the product stops. There is another system which is a variation on this and may be patented. Instead of shutting a door above the metering wheel they disconnect the metering wheel from the drive by use of a clutch mechanism of some type. This is both complicated and necessitates the metering wheels all be driven by individual clutches. Typically, this is done with a gear that is slotted in and out which is actuated pneumatically.

Described in U.S. Pat. No. 7,555,990B2 is a head with a valve incorporated. The product is re-directed from the bar back towards the bin. This is complex, requiring extra hosing back to the bin and also is not suitable where mixed products are used in one line. For example, it is possible with most systems to add some starter fertiliser to the seed so having a mixture of product. Which tank would this mixture of product be returned too.

A sectional control system is described in US Patent Publication 2012/0301231A1. The primary head is described as upside down 'head at bottom' on their bin. The primary head is located where the outlet to the bar is shot and takes re-directed 'clean' air from the inside a bend on the primary riser and send it out to the bar. Multiple lines run to the bar and have a system with elbows and actuators that is complicated.

A disadvantage of the above system is that product can become trapped in the head as it is upside down. This affects distribution of the seed. Also, the shut off system is close to the bin such that it can take up to 5-8 seconds for all of the product to work its way out of the air system. Typically, at 8 km/hr this is around 10 or more metres where the bar is still seeding.

Object

It is the object of the present invention to overcome or substantially ameliorate at least one of the above discussed disadvantages.

SUMMARY OF INVENTION

There is disclosed herein an assembly to distribute flowable particulate (granular) material, the assembly including:

a conduit to which the material is delivered and to which an airstream is supplied to move the material along the conduit to a delivery downstream destination:

material delivery means connected to the conduit for delivery of material to the downstream destination:

a separator to engage the airstream to concentrate the material in a portion of the airstream, the separator being positioned within the conduit upstream of the material delivery means;

a control device operatively associated with the material delivery means to selectively deliver a pre-determined rate of the material to the separator; and air distribution means in constant fluid communication with the separator and the material delivery means to control airflow to the material delivery means.

In one embodiment, the separator includes an insert member having a first cross-sectional area and decreasing in cross-sectional area upstream and downstream of the first cross-sectional area to second and third cross-sectional areas smaller than the first cross-sectional area, so as to concentrate the material within a peripheral portion of the airstream and divert the material away from the air intakes located in the central part. Preferably, the insert member includes an inlet portion in fluid communication with the air distribution means, for air flow from the conduit to the air distribution means.

Still preferably, the separator includes a perforated screen for substantially separating the material from air.

In one embodiment, the conduit includes a first portion having a first cross-sectional area, and an increasing cross-sectional area upstream and downstream of the first cross-sectional area providing a first path for the concentrated material toward the material delivery means and a second path for the airstream toward the air distribution means. Preferably, the conduit includes apertures configured to direct the airstream toward the air distribution means.

In another embodiment, the conduit includes a first portion having a first cross-sectional area, wherein the cross-section area increases upstream and downstream from the first cross-sectional area to a respective second and third cross-sectional area larger than the first cross-sectional area. Preferably, the separator includes a perforated screen to separate the material.

Preferably, the conduit is a primary conduit, and the material delivery means includes a plurality of secondary conduits to which material is delivered from the primary conduit.

In one embodiment the pre-determined rate through at least one of the secondary conduits may be zero.

Preferably, the control means is configured to independently control each secondary conduit for selective distribution of the material.

In one embodiment, the control means provides uniform distribution of the material through the plurality of secondary conduits.

Alternatively, the control means provides non-uniform distribution of the material through the plurality of secondary conduits.

Preferably, the separator includes a screen positioned upstream of the air distribution means, the screen having perforations for separating material from the airstream.

Still preferably, the perforations in the screen have a diameter related to the size of material.

In one embodiment, the separator includes a plurality of apertures of larger size or a single large intake related to the amount of separated air required to effectively clean the material delivery means. In this case the size of apertures may significantly exceed the size of material.

In one embodiment the separator includes a diverter to divert the material outwardly within the conduit, and allowing air to flow through a central portion of the conduit.

Preferably, the air distribution means includes an air distribution head and a plurality of air ducts extending therefrom, the air distribution head having an inlet connected to the separator and at least one outlet connected to a respective air duct.

Preferably, the separator is proximal to the air distribution head.

Still preferably, each air duct is connected to a respective material delivery duct at an obtuse angle $\alpha$ to the flow direction of the material.

In one embodiment, each air duct is connected to each respective material delivery duct via a T or Y coupling at an obtuse angle $\alpha$ to the flow direction of the material.

In an alternative embodiment each air duct is connect to each respective material delivery duct via a 3-way valve positioned on an outlet of the primary manifold, or product distribution head.

Preferably, the control means includes an electrically operated control valve positioned on each secondary conduit adjacent the primary manifold. Each control valve may be configured to operate in a closed loop.

There is further disclosed a plough including the above assembly, a bin to receive seed and/or fertiliser, and an air delivery system to delivery the particulate material to the assembly.

BRIEF DESCRIPTION OF DRAWINGS

Preferred forms of the invention will now be described by way of example with reference to the accompanying drawings wherein:

Figure 1:
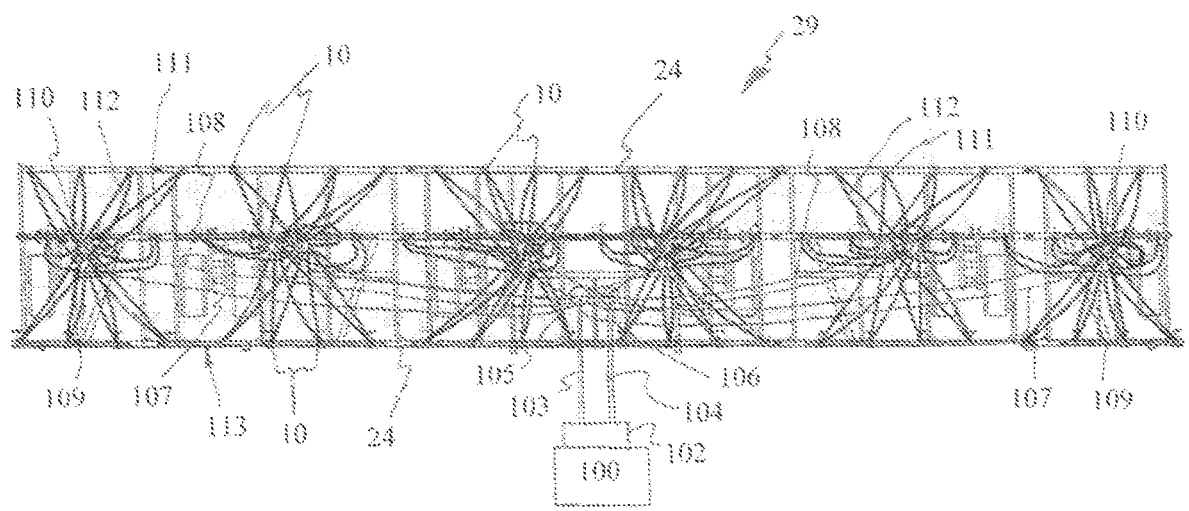
Figure 2:
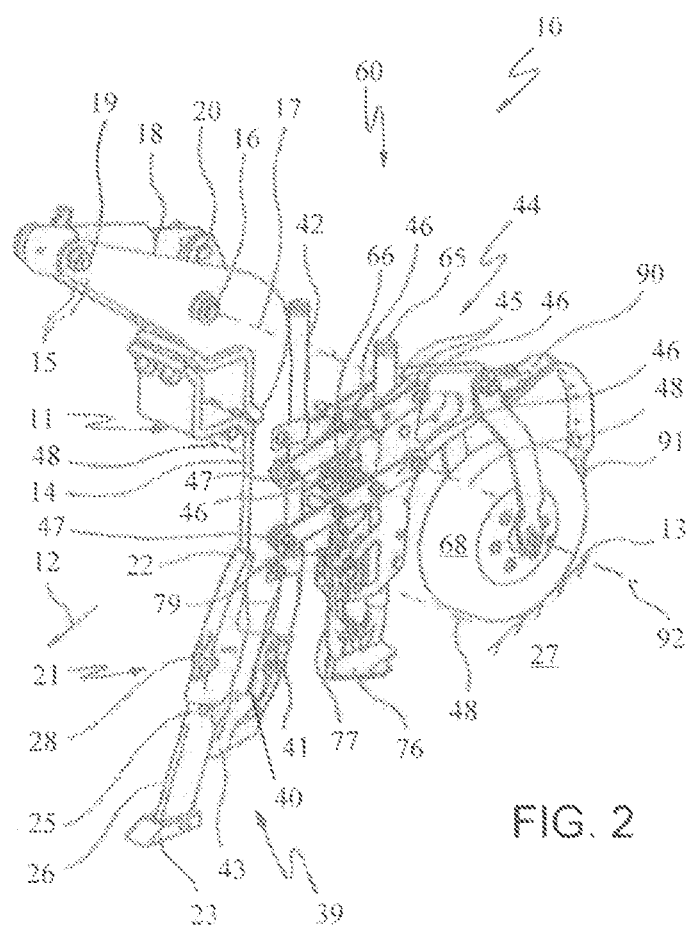

FIG. 1 is a schematic top plan view of a plough incorporating a plough frame and a plurality of plough assemblies;

FIG. 2 is a schematic isometric view of a plough assembly of the plough of FIG. 1;

FIG. 3 shows one embodiment of a seed or fertiliser distribution assembly:

FIG. 4 shows another embodiment of a seed or fertiliser distribution assembly;

FIG. 5 show a further embodiment of a seed or fertiliser distribution assembly; and FIG. 6 shows yet a further embodiment of a seed or fertilizer distribution assembly.

DESCRIPTION OF EMBODIMENTS

In the accompanying drawings there is schematically depicted a plough 29 having a plurality of plough assemblies 10. Each plough assembly 10 is intended to be attached to a plough frame 30 that includes a pair of transverse beams 24 engaged by a clamp 11 (FIG. 2) of each assembly 10. Typically, the frame 30 would have attached to it a plurality of the assemblies 10, and would be drawn in a forward direction 12 by a prime mover such as a tractor. Each assembly 10 would be moved through a soil layer 27 having an upper surface 13.

Supported by the clamp 11 is a digging and seeding assembly 60. The assembly 60 includes a digging shank (tine) 14 pivotally attached to the clamp 11 by a pair of brackets 15 fixed to the clamp 11. The shank 14 is pivotally attached to the brackets 15 by means of a pivot pin (bolts) 16 so that the shank 14 can pivot about the generally horizontal transverse axis 17. The axis 17 is generally perpendicular to the direction 12. Extending between the shank 14 and the brackets 15 is a hydraulic ram 18 that urges the shank 14 to a predetermined digging position as shown in FIG. 2. However, when an obstacle is encountered, the shank 14 is allowed to pivot rearwardly in a direction opposite the direction 12 about the axis 17, by contraction of the ram 18. Once the obstacle has passed, the ram 18 causes the shank 14 to move to its operative predetermined digging position as shown in FIG. 2.

The ram 18 is pivotally attached to the brackets 15 by means of a pivot pin (bolt) 19, while the ram 18 is pivotally attached to the shank 14 by means of a pivot pin (bolt) 20. The pins 19 and 20 provide for pivoting movement about axes parallel to the axis 17.

Attached to a lower portion of the shank 14 is a digging assembly 21. The digging assembly 21 includes a mounting member 22 and a digging blade 23.

The mounting member 22 includes an upwardly extending cavity within which there projects a digging blade part 25, to a lower end of which there is attached the blade 23. Typically, the part 25 would include a forward-facing portion 26 formed of harder material that would resist wear.

The shank 14 locates the part 25 so that it projects below the surface 13 to locate the blade 23 at a desired position in the soil layer 27.

The mounting member 22 receives a pin 28 that passes through passages in the mounting member 22 to engage in a selected pair of slots. In that regard it should be appreciated that pairs of slots are formed in each side of the part 25, with the pin 28 engaging the selected slots to adjust the height of the blade 23 relative to the shank 14, and therefore the distance below the surface 13.

The lower portion of the part 25 is provided with a projection that extends into a passage in the blade 23. The projection has a pair of rearwardly extending slots 32 that receive a pin to secure the blade 23 to the part 25. In particular, the blade 23 has a rearwardly facing aperture through which the pin is inserted to locate the pin in the slots to fix the blade 23 to the part 25. In particular, the blade 23 has slots that also receive the pin to fix the blade 23 to the part 25.

The blade 23 includes a body with a leading portion to which there is attached wear plates. The wear plates are forward facing and have leading surfaces inclined to the direction 12, by an acute angle, so as to be upwardly and forwardly facing. The blade body has an upwardly facing surface that slopes upwardly to the rear at an acute angle the upwards facing surface 49 engages the soil after it has been engaged by the surfaces of wear plates. The angle is relative to the horizontal and the soil surface 13, and is about 5°.

Also attached to the shank 14 is a fertiliser delivery assembly 39 that delivers fertiliser to the trough formed by the blade 23.

The fertiliser assembly 39 includes a mounting member 40 attached to the shank 14 by threaded fasteners. The assembly 39 includes a tubular part 41 to which there is attached a tube 42 to which there is delivered fertiliser. The tube 42 communicates with a fertiliser boot 43 that is hollow and receives the fertiliser and delivers the fertiliser to the soil trough being formed by the blade 23.

Also attached to the shank 14 is a seeding assembly 44. The seeding assembly 44 includes parallel mounting plates 45 that are maintained in a generally upright orientation, and attached to the shank 14 by a parallelogram mechanism including four links 46. The links 46 are arranged in pairs, including an upper pair and a lower pair, with all the links 46 being maintained parallel. Each link 46 is pivotally attached to the shank 14 and the plates 45 by transverse bolts (pins) 47 so that each link 46 pivots relative to the shank 14 and plates 45 about the generally horizontal transverse axes 48. The axes 48 are generally perpendicular to the direction 12.

Due to the parallelogram arrangement of the links 46, the plates 45 are maintained in their generally upright orientation during pivoting movement of the links 46.

Attached to the plates 45 is a seeding boot 76 by means of a support member 77. The support member 77 is attached to the seeding boot 76 by transverse bolts. The member 77 engages a mounting 79.

The mounting 79 is attached to the plates 45 by transverse bolts (not illustrated).

Extending to the boot 76 is a seed delivery tube 65, to which seed is delivered for delivery to the duct in the boot 76.

A spring 66 extends between the upper links 46 and the shank 14 to urge the seeding assembly 44 downward. Tension in the spring 66 is adjustable.

Extending rearwardly from and fixed to the plates 45 is a mounting member 90 to which a press wheel 68 is attached. A scraper 91 engages the radial outer surface of the wheel 68 to remove soil therefrom. The wheel 68 is rotatable about a transverse horizontal axis 92 that is parallel to the axes 48.

The wheel 68 engages the soil surface 13 to maintain the boot 76 at a desired depth.

The above assembly 10 is more fully described in Australian Patent Application 2016265961 (U.S. patent application Ser. No. 15/406,239).

With particular reference to FIG. 1, the plough 29 further includes a bin 101 that stores seed and/or fertiliser. In this embodiment, the bin 101 separately stores seed and fertiliser. Associated with the bin 101 is a motor and air supply (blower) assembly 102.

Extending from the assembly 102 and bin 101 is a primary conduit 103 that receives fertiliser, with the fertiliser being moved along the primary conduit 103 by air provided by the assembly 102. A primary conduit 104 extending from the air supply 102 and bin 101 receives seed that is moved along the primary conduit 104 by air provided by the assembly 102.

The primary conduit 103 extends to a primary manifold 105, while the primary conduit 104 extends to a primary manifold 106. Extending from the primary manifold 105 is a plurality of secondary conduits 107 that receive fertiliser from the primary manifold 105.

Extending from the primary manifold 106 is a plurality of second conduits 108 to which seed is delivered from the primary conduit 104.

Each of the secondary conduits 107 extends to a secondary manifold 109, while each of the secondary conduits 108 extends to a secondary manifold 110. As can be seen in FIG. 1, there is a plurality of the secondary manifolds 109 and 110.

Extending from each of the secondary manifolds 109 is a plurality of delivery conduits 111, while extending from each of the secondary manifolds 110, is a plurality of delivery conduits 112. Each of the delivery conduits 111 and 112 extends to an associated plough assembly 10. In this embodiment, each delivery conduit 111 extends to a respective one of the tubes 42 to deliver fertiliser thereto. Each of the delivery conduits 112 extends to a respective one of the tubes 65 to deliver seed thereto.

In this embodiment, the primary manifolds 105, 106, are substantially identical. In the following description in respect of FIGS. 3, 4 and 5, the granular material distribution assembly 113 will be described as incorporating primary conduit 104, primary manifold 106, and secondary conduit 108.

As described previously, and with reference to FIG. 1, the primary conduit 104 receives granular material, or seed, from the assembly 102 with air flow causing movement of the seed.

FIGS. 3 to 6 show an assembly 113 to distribute flowable particulate (granular) material, for example, seed. The primary conduit 104 extends to a product distribution head, or primary manifold 106 from where the seed is then distributed to the material delivery means, or secondary conduits 108. A separator 116 is located within the conduit 104 below the primary manifold 106 to separate a portion of air from the material. An air distribution head 125 distributes the separated air to respective air conduits 118 for reentry into the material within the secondary conduits 108. A control device with control valve 114 controls flow of the material through each secondary conduit 108. The air is introduced into the material downstream of the control valve 114.

FIGS. 3 to 6 show different embodiments of the assembly 113 where like features are identified with like reference numbers.

Figure 3:
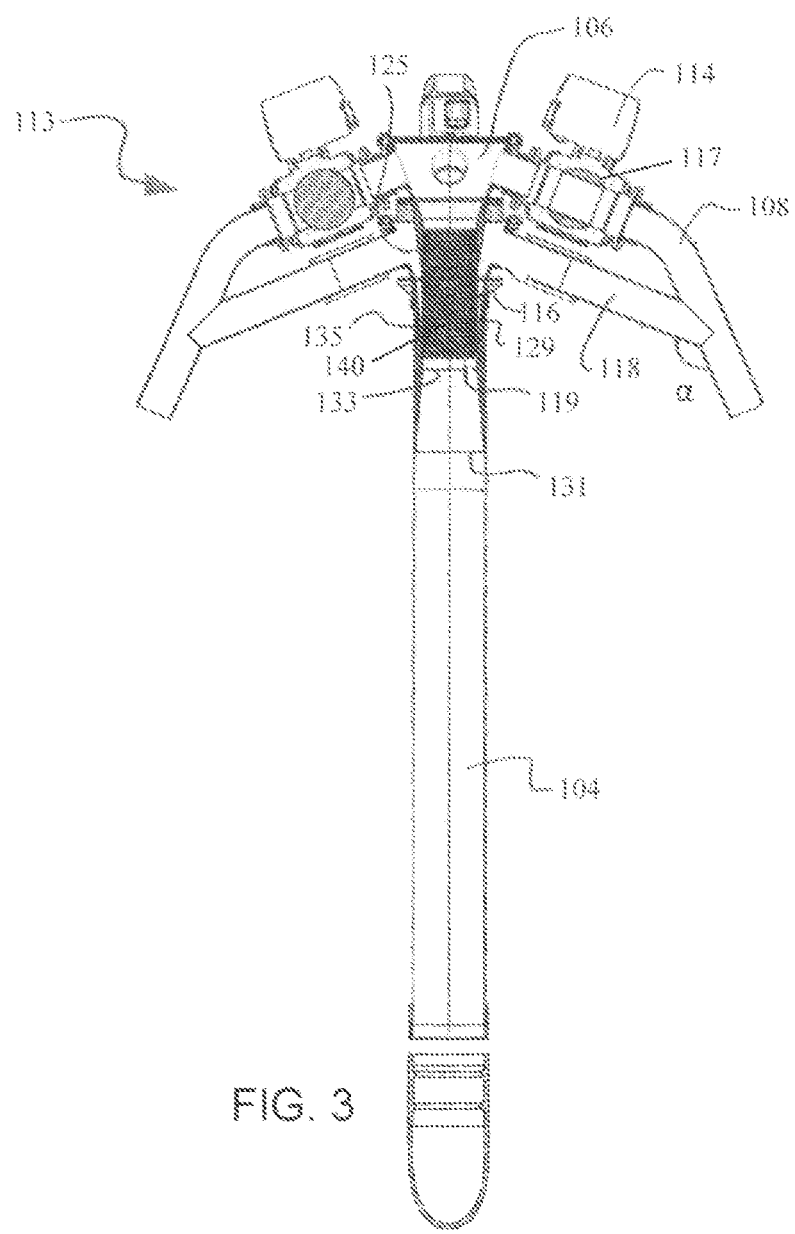

In FIG. 3, the primary conduit 104 includes an accelerator portion 119 in the form of an insert having a first cross-sectional area 133 and expanding in cross-sectional upstream area 131 and downstream area 135 respectively. The decrease in cross-sectional area toward the primary manifold 106 increases the velocity and momentum of the material through the separator 116. In this embodiment the separator 116 includes a perforated screen 140 including perforations 129. The number and size of perforations 129 is related to the size of the inlet into the air distribution head 125, and preferably at least of the same total area and up to 5 times that area, a perforation may range from 0.1 mm to 25 mm. Material is concentrated in a portion of the airstream and being too heavy to change direction continues toward the primary manifold 106, and is selectively distributed through the control valve 114 into each secondary conduit 108. In the embodiment of FIG. 3, the control valve 114 includes a ball valve 117. The airstream re-enters the secondary conduit 108 via an air conduit 118 connected to the secondary conduit 108 downstream of the control valve 114. The connection of the air conduit 118 to the secondary conduit 108 is at an obtuse angle α to ensure material, or seed, does not enter the air conduit 118.

Figure 4:
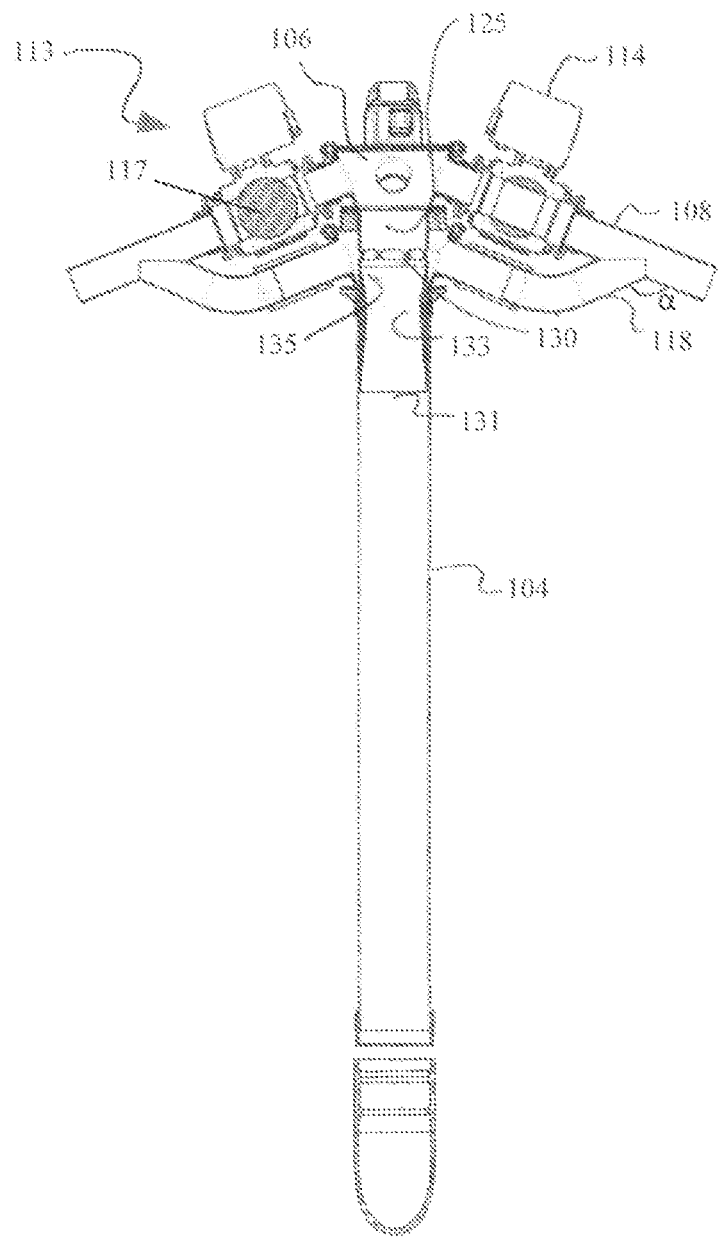

The assembly 113 in FIG. 4 operates in a similar manner to the assembly 113 shown in FIG. 3. The difference being in the separator 116. In FIG. 4, a plurality of slots 130 replaces the perforated screen. The slots 130 allow the airstream to enter the air distribution head 125 for distribution to the air conduits 118 while the material continues toward the primary manifold 106. The size of the slots 129 depends on velocity and weight of the material and can significantly exceed the size of the material.

Figure 5:
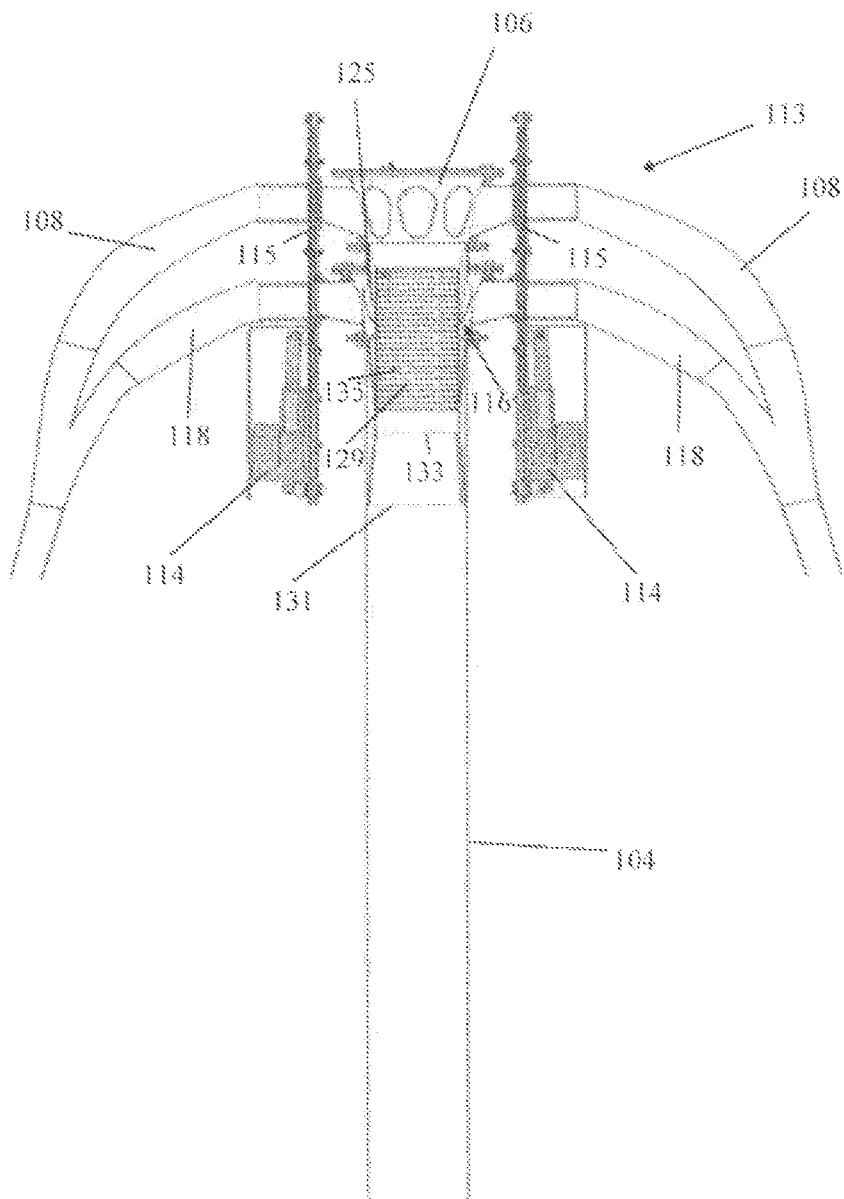
Figure 6:
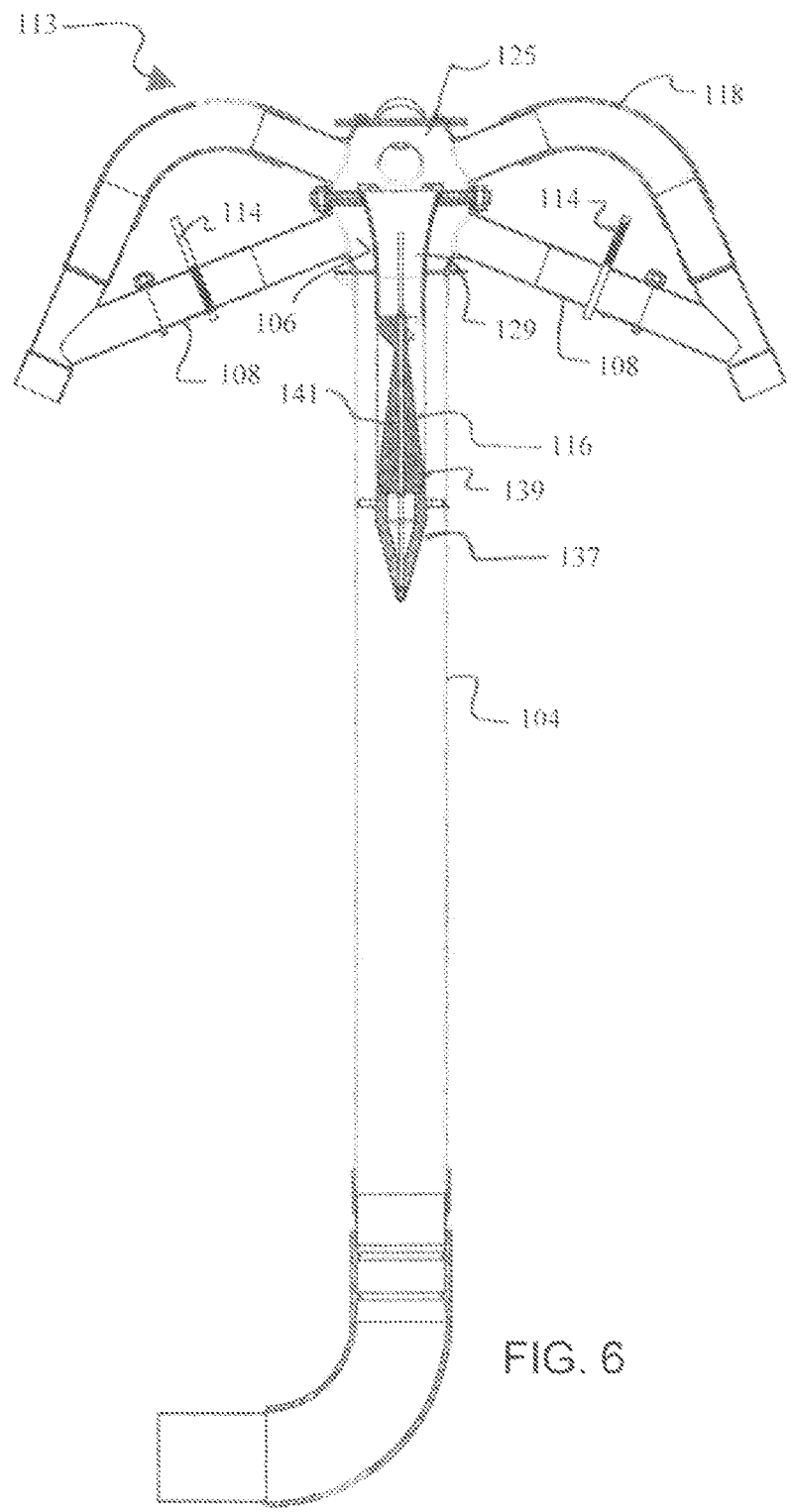

In FIG. 5, the primary conduit 104 includes an accelerator portion 119 having a first cross-sectional area 133 and expanding in cross-sectional area upstream 131 and downstream 135 respectively. The decrease in cross-sectional area as the material and air flow toward the primary manifold 106 increases the velocity and momentum of the material through the separator 116. In this embodiment the separator 116 includes a perforated screen. The number and size of perforations 129 is related to the size of the inlet into the air distribution head 125, and preferably at least of the same total area and up to 5 times that area, a perforation may range from 0.1 mm to 25 mm. Material is concentrated in a portion of the airstream and being too heavy to change direction continues toward the primary manifold 106, and is selectively distributed through the control valve 114 into each secondary conduit 108. In the embodiment of FIG. 5, the control valve 14 includes a sliding gate valve 115. The airstream re-enters the secondary conduit 108 via an air conduit 118 connected to the secondary conduit 108 downstream of the control valve 115.

In FIG. 6 the material delivery means, or secondary conduits 108 are below the air conduits 118. In this embodiment an insert member (diverter) 141 is positioned within the primary conduit 104. The insert member 141 has an increasing cross-sectional area 137 followed by a decreasing cross-sectional area 139 in a direction downstream towards the air distribution head 125. This increased cross-sectional area of the insert member 141 causes an initial acceleration of the seed/air mixture in the axial direction along the conduit 104 concentrating the material in a peripheral portion of the airstream. The decreased cross-sectional area of the insert member 141 air provides minimal radial disturbance to seed trajectories, and urges air through a central valve of the insert member 141 of the conduit 104 and into the air distribution head 125 while the material, or seed continues toward the seed distribution head, or primary manifold 106.

In this embodiment the air distribution head 125 includes an inlet extending from the separator 116. Extending from the air distribution head 125 are air conduits 118 that extend to the conduit 108 at a position downstream of the flow control valve 114. Similar to the previously described embodiments air from the separator 116 is returned to the conduit 108 via the conduit 118.

Preferably, the air conduits 118 have a connection to the air distribution head 125 with a relatively short path providing small hydraulic resistance. This helps to ensure that pressure in all secondary manifolds 110 (closed and open) is equalised so the exhaust velocity distribution per tine 14 remains uniform. Connection of the air conduits 118 to the material delivery, or primary conduits 108 is orientated at an obtuse angle α relative to the flow direction of the product to prevent seed, or granular, from getting into the air distribution head 125. Flow control valves 114 are installed on outlets of the primary manifold 106. The control valves 114 may be operated in a closed loop with product delivery sensors (not shown) to allow for extra control over seed distribution. This can be used to compensate for random variations in geometry or changes in the flow vortex structure and may be particularly useful when the tractor is moving on a curved path.

An advantage of the present invention is that air separation and distribution are done at the primary manifold 106 in a single unit of assembly 113 which facilitates installation and retrofit.

The above described preferred embodiment has the particular advantage that the conduits 107 and 108 are less likely to become blocked.

The invention claimed is:

1. An assembly to distribute flowable particulate material, the assembly including:

a conduit to which the material is delivered and to which an airstream is supplied to move the material along the conduit to a delivery downstream destination;

a separator to engage the airstream to concentrate the material in a portion of the airstream by separating a portion of the airstream, the separator being positioned within the conduit;

a material delivery apparatus connected to the conduit downstream of the separator to receive the flowable particulate material and deliver the material to the downstream destination;

an air distribution head in constant fluid communication with the separator to receive the separated portion of the air stream and also in constant fluid communication with the material delivery apparatus to assist the delivery of the flowable particulate material by the material delivery apparatus to the downstream destination by delivering the separated portion of the air stream to the material delivery apparatus; and a control device operatively associated with the material delivery apparatus to selectively deliver a pre-determined rate of the material to the downstream destination.

2. The assembly to distribute flowable particulate material as claimed in claim 1, wherein the separator includes an insert member having a first cross-sectional area and decreasing in cross-sectional area upstream and downstream of the first cross-sectional area to second and third cross-sectional areas smaller than the first cross-sectional area, so as to concentrate the material within a peripheral portion of the airstream and divert the material away from an air intakes located in the insert member.

3. The assembly to distribute flowable particulate material as claimed in claim 2, wherein the insert member includes an inlet portion in fluid communication with the air distribution head, for air flow from the conduit to the air distribution head.

4. The assembly to distribute flowable particulate material as claimed in claim 1, wherein the conduit includes a first portion having a first cross-sectional area, and an increasing cross-sectional area upstream and downstream of the first cross-sectional area providing a first path for the concentrated material toward the material delivery apparatus and a second path for the airstream toward the air distribution head.

5. The assembly to distribute flowable particulate material as claimed in claim 1, wherein the conduit includes a first portion having a first cross-sectional area, wherein the cross-section area increases upstream and downstream from the first cross-sectional area to a respective second and third cross-sectional area larger than the first cross-sectional area.

6. The assembly to distribute flowable particulate material as claimed in claim 1, wherein the conduit is a primary conduit, and the material delivery apparatus includes a plurality of secondary conduits to which material is delivered from the primary conduit.

7. The assembly to distribute flowable particulate material as claimed in claim 6, wherein the pre-determined rate through at least one of the secondary conduits is zero.

8. The assembly to distribute flowable particulate material as claimed in claim 6, wherein the control device is configured to independently control each secondary conduit for selective distribution of the material to each secondary conduit.

9. The assembly to distribute flowable particulate material as claimed in claim 6, wherein the control apparatus provides uniform distribution of the material through the plurality of secondary conduits.

10. The assembly to distribute flowable particulate material as claimed in claim 1, wherein the separator includes a screen positioned upstream of the air distribution head, the screen having perforations for separating material from the airstream.

11. The assembly to distribute flowable particulate material as claimed in claim 1, wherein the separator includes a diverter to divert the material outwardly within the conduit, and allowing air to flow through a central portion of the conduit to the air distribution head.

12. The assembly to distribute flowable particulate material as claimed in claim 1, wherein the air distribution head includes a plurality of air ducts extending therefrom, the air distribution head having an inlet connected to the separator and at least one outlet connected to a respective air duct.

13. The assembly to distribute flowable particulate material as claimed in claim 12, wherein the material delivery apparatus includes a plurality of material delivery ducts, and each air duct is connected to a respective material delivery duct at an obtuse angle $\alpha$ to the flow direction of the material.

14. The assembly to distribute flowable particulate material as claimed in claim 6, wherein the control device includes an electrically operated control valve positioned on each secondary conduit.

15. The assembly to distribute flowable particulate material as claimed in claim 14, wherein the control device includes a sliding gate valve operatively associated with the material delivery apparatus and the air distribution head to selectively deliver a pre-determined rate of the material to the downstream destination.

16. The assembly to distribute flowable particulate material as claimed in claim 13, wherein the control device includes an electrically operated control valve positioned on each air duct.

* * * * *